US006739587B2

(12) United States Patent
Migliori

(10) Patent No.: US 6,739,587 B2
(45) Date of Patent: May 25, 2004

(54) TOGGLE LEVER CLAMPING DEVICE

(76) Inventor: Luciano Migliori, Piazza Appio. Claudio 8, Milan (IT), 20124

(*) Notice: Subject to any disclaimer, the term of this patent is extended or adjusted under 35 U.S.C. 154(b) by 0 days.

(21) Appl. No.: 10/124,475

(22) Filed: Apr. 18, 2002

(65) Prior Publication Data

US 2002/0153651 A1 Oct. 24, 2002

(30) Foreign Application Priority Data

| | | |
|---|---|---|
| Apr. 19, 2001 | (IT) | MI2001A0831 |
| Jun. 12, 2001 | (IT) | MI2001A1234 |
| Jan. 25, 2002 | (IT) | MI2002A0133 |

(51) Int. Cl.[7] .......... B23Q 3/02
(52) U.S. Cl. .......... 269/32; 269/27
(58) Field of Search .......... 269/29, 27, 32, 269/239, 228, 91, 93, 94, 237, 238; 74/470, 105

(56) References Cited

U.S. PATENT DOCUMENTS

| | | |
|---|---|---|
| 4,445,676 A | 5/1984 | Tunkers |
| 4,921,233 A | 5/1990 | Fabrice |
| 4,923,184 A | 5/1990 | Schauss |
| 5,165,670 A | 11/1992 | Sawdon |
| 5,676,357 A | 10/1997 | Horn |

FOREIGN PATENT DOCUMENTS

| | | |
|---|---|---|
| EP | 0 268 176 B1 | 9/1987 |
| EP | 1 025 950 A2 | 9/2000 |

*Primary Examiner*—Robert C. Watson
(74) *Attorney, Agent, or Firm*—Young & Thompson

(57) ABSTRACT

A toggle lever clamping device for clamping a workpiece to a support frame includes a box-shaped head to which a clamping arm is pivoted to rotate between an open and a closed condition to release respectively to lock the workpiece; the clamping arm is operatively connected to an actuator by a toggle lever mechanism having a dead center condition beyond which the clamping arm is tightened against the workpiece. The toggle mechanism includes an elastically yieldable connection link which, upon reaching the dead center of the toggle lever mechanism is sequentially allowed to axially yield for a some degree and to deflect in a controlled mode by a confronting stop provided on the same clamping arm.

20 Claims, 5 Drawing Sheets

TOGGLE LEVER CLAMPING DEVICE

BACKGROUND OF THE INVENTION

This invention refers to a toggle lever clamping device for locking workpieces, and in particular is directed to a device for clamping metal sheet or pieces in the bodywork construction of motor vehicles; however other different uses are possible for a clamping device according to this invention.

STATE OF THE ART

Toggle lever clamping devices, normally used to clamp work pieces against a supporting frame, are widely known and described for example in U.S. Pat. Nos. 4,445,676; 4,921,233; 4,923,184; 5,165,670; EP 1.025.950 and EP 0.268.176.

In general, a clamping device of the aforesaid type comprises a box-shaped head to which a clamping arm is pivoted and is operatively connected, by a toggle lever mechanism, to a pneumatic, electric or other type of linear actuator to perform a tilting movement between an open position and a closed position to release, respectively to lock a workpiece.

The clamping arm is usually connected to a sliding rod of the actuator by means of a toggle lever mechanism comprising an intermediate connection link hinged to the clamping arm and to the sliding rod of the actuator.

In clamping devices of this kind, the axial movement of the actuator is usually transmitted to the clamping arm by means of a rigid connection link which, during movement must pass a dead centre condition of the toggle lever mechanism, beyond which the articulated connection between the rod of the actuator and the clamping arm assumes an apparent condition of irreversibility.

In practice, in order to overcome the dead centre position, it is necessary to generate relatively high forces when the device has to be shifted to the clamping position. In addition, to carry out the reverse movement, or opening movement, it is again necessary to exert similarly high forces, considerably higher than those required for shifting the device to the closed position, or it is necessary to exert an axial thrust by striking sharply from the outside, to make the rod of the actuator and the connection link move backwards, in order to release the rotation of the clamping lever.

The use of a rigid connection link in the toggle connection between the clamping arm and the actuator, and consequently the high forces which must be exerted to operate the clamping device, both for opening and for closing, give rise to considerable strain on the various parts of the device; this in turn causes excessive wear on the moving parts, which consequently call for periodical maintenance or replacement.

In addition to the possible breakage or irregular operation of the clamping device, the replacement of worn out parts is time consuming and involves additional costs.

In order to partly obviate these problems, U.S. Pat. No. 4,445,676 suggests the use of a toggle lever mechanism comprising an elastically yieldable connection link specially made with a long T-shaped slit to divide the same link into two hinging portions connected by an intermediate elastic arm capable of bending sideways, to allow a relative displacement between the two hinging axes of the link.

While on the one hand, the use of a simple elastically yieldable connection link partly solves the problems deriving from the strong stresses and wear on the movable parts of the device, on the other it gives rise to further problems and inconveniences in that it does not allow optimal irreversible clamping of the device which, in the presence of external forces on the clamping arm, is liable to accidentally disengage itself and release the clamped workpiece.

In addition to the impossibility of maintaining the workpiece firmly clamped, the use of a simple elastic connection link involves the risk that, after being repeatedly operated, the link can become damaged or break under strong clamping forces, rendering the device totally unserviceable.

To this purpose, during several tests it was noted that if the deflection of the elastically yielding link of the toggle lever mechanism is not precisely calculated in relation to the tightening torque to be exerted and the stresses that the same system undergoes in passing from one side to the other one of the dead centre point, or whenever a workpiece to be clamped is of a thickness even only slightly greater than contemplated, any damage of the connection link my jeopardize the irreversibility and functioning of the clamping device.

SCOPES OF THE INVENTION

Consequently, there is a need to further improve these clamping devices by providing them with an irreversible final action in such a way as to render the clamping devices extremely reliable and much safer.

Therefore, the main scope of this invention is to provide a clamping device of the aforementioned type, which is structurally simple and provided with an elastically yielding toggle connection link allowing to operate the clamping device in a controlled condition and in a much safer and extremely reliable mode.

A further scope of this invention is to provide a clamping device as described above, provided with a toggle lever mechanism having a differentiated clamping action, capable both of controlling the axial compression of the connection link, providing at the same time an irreversible final action in the clamping condition of the device.

A further scope of the invention is to provide a clamping device of the aforementioned type provided with a toggle lever mechanism comprising an elastically yieldable connection link suitably designed to considerably increase safety and reliability of the same clamping device, by a single and inexpensive construction and such as to ensure a higher force to lock a workpiece.

BRIEF DESCRIPTION OF THE INVENTION

According to the invention, a toggle lever clamping device has been provided, comprising:

- a box-shaped head having a longitudinal axis;
- a clamping arm pivotally connected at one end of the box-shaped head to rotate between open and closed conditions to lock respectively to release a workpiece;
- a linear actuator at the other end of the boxshaped head; and
- a toggle lever mechanism operatively connected between the actuator and the clamping arm,
- said toggle lever mechanism comprising an elastically yieldable connection link having a longitudinal axis extending between hinging ends, said toggle lever mechanism having a dead centre condition beyond which the connection link maintains the clamping arm tightened against the workpiece,
- wherein said elastically yieldable connection link comprises spaced apart stop means arranged to prevent an axial compression of the connection link upon reaching and overcoming said dead centre condition of the toggle lever mechanism.

According to a further aspect of the invention, the stop means for preventing the axial compression of the connection link, at and beyond the dead centre of the toggle lever mechanism, during the closure of the clamping device, comprise stop members oppositely arranged and axially extending from the hinging ends of the connection link; preferably said stop members are constructed and arranged to sequentially allow a controlled axial compression of the link upon reaching the dead centre point and a successive controlled angular deflection of same link beyond the dead centre point during the closure of the claming device.

The disposition of surface contact means at the facing front ends of the stop members, on slanting or diverging planes allows for an initial gentle and controlled elastic yielding action of the connection link during the closure of the clamping device, which enables to pass the dead centre position without any excessive force.

Still according to this invention, after passing the dead centre position, the movement of the connection link can continue in a controlled mode for a certain degree until it reaches a final stopping position in which the surface contact means of the stop members take a relative disposition, on slanted planes which stiffens the connection link, further preventing its axial compression, while allowing an angular defection of the same link; an irreversible final action and a controlled locking action of a workpiece is thereby provided, which is not obtainable with other clamping devices previously known.

The safety and reliability of the clamping device are thus considerably increased.

BRIEF DESCRIPTION OF THE DRAWINGS

These and further features of some embodiments of a clamping device according to this invention, will be more clearly evident from the following description with reference to the accompanying drawings, in which.

DETAILED DESCRIPTION OF THE INVENTION

Figure 1:
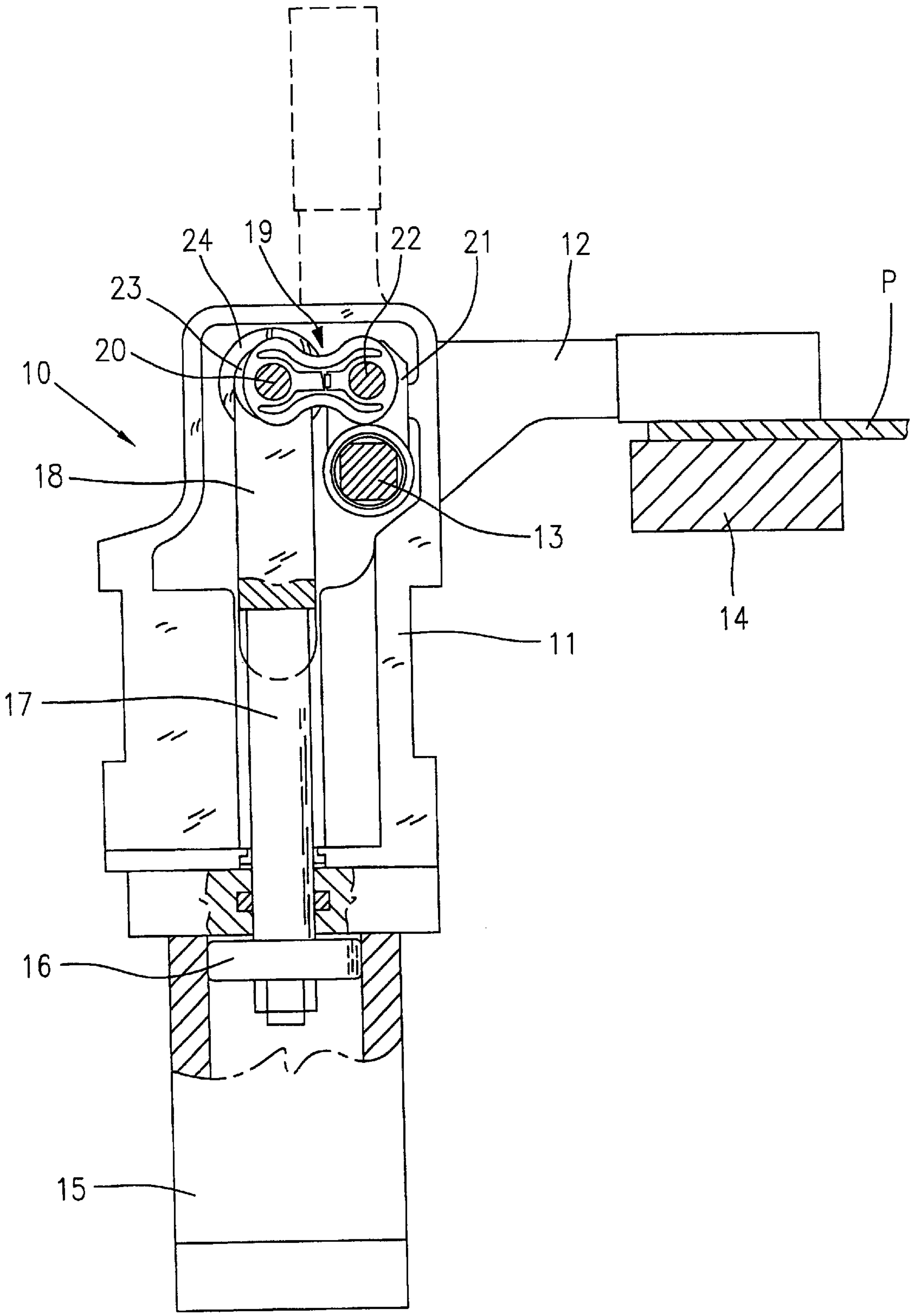
FIG. 1 shows a general view of a clamping device according to the invention, in which one half of the box-shaped head has been removed to show the internal mechanism.

FIG. 1 shows an overall view of a clamping device 10; the device 10 comprises a box-shaped head 11 made by two side by side arranged shell members, to which is pivoted a clamping arm 12 connected to a pivot shaft 13 to enable it to be rotated from a raised or open position, shown by phantom lines in FIG. 1, to a lowered or closed position in which the clamping arm 12 locks a metal sheet or workpiece P against a supporting frame 14.

The clamping arm 12 is operatively connected to a linear actuator 15, for example a hydraulic or a pneumatic cylinder, by means of a three-point articulated system or toggle lever mechanism comprising an intermediate connection link 19, hinged between the clamping arm 12 and the actuator 15.

More precisely, in the example of FIG. 1 the cylinder 15 comprises a piston member 16 having a rod 17 provided with a fork 18 hingedly connected at 20 to one end of an elastically yieldable connection link 19; the other end of the link 19 is hinged at 22, to a crank lever 21 integral with or fastened to the clamping lever 12 by means of the same pivot shaft 13; the fork 18 of the piston rod 17, the connection link 19 and the crank lever 21 define a three-point articulated system, or toggle lever mechanism having a dead centre condition beyond which the system, with the cylinder 15 in a non-operative condition, becomes irreversible to maintain the arm 12 in the clamping condition for the piece P, as shown in FIG. 1. Reference number 23 indicated a guide roller for the fork 18, while reference number 24 indicates a pad at the forward end of the guide for roller 23 to stop the fork 18 and to reduce the noise when reaching the stop position for the clamping arm 12.

According to the general aspect of the invention, the toggle lever mechanism comprises an elastically yieldable connection link 19 provided with stop means designed to control and limit its axial compression, thereby allowing the mechanism, with the actuator in a non-operative condition and the device in the clamping condition, to smoothly overcome the reaction forces at the dead point and to be practically irreversible.

Figure 2:
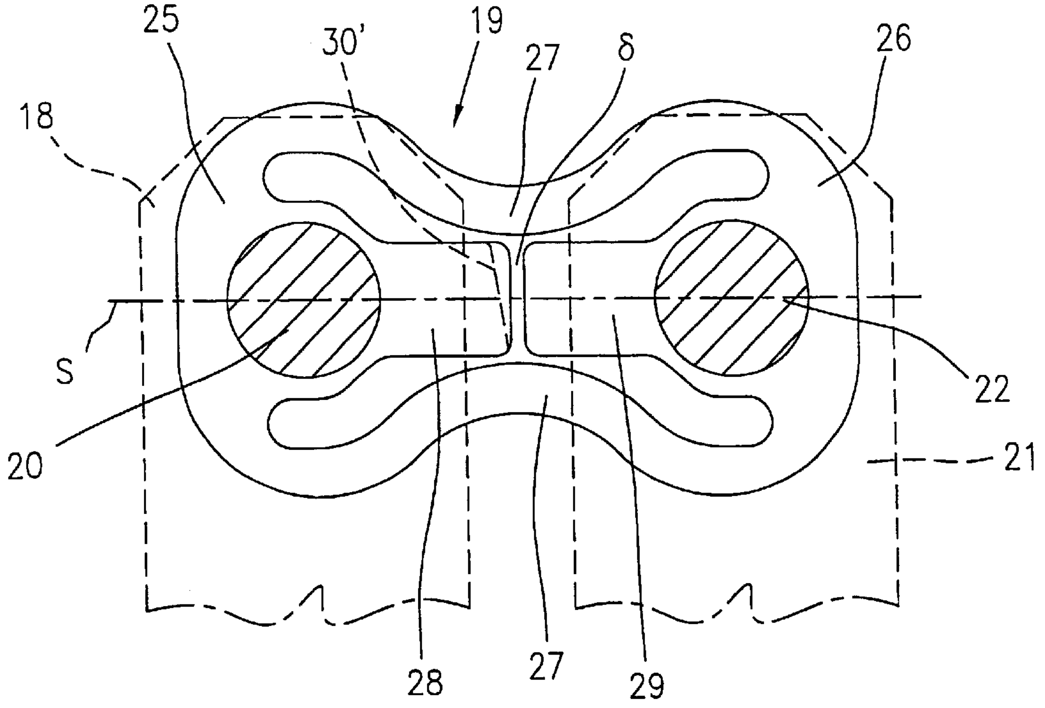
FIG. 2 shows an enlarged view of the connection link of the toggle lever mechanism, according to the invention.

The connection link 19, according to a first embodiment shown in FIG. 2, comprises two hinging end parts 25, 26, connected each other by two elastically yieldable arc-shaped side arm 27 curved inwards so as to allow an axial compression and a side deflection of the same link as explained further on.

As shown in FIG. 2, in alignment with the longitudinal axis S of the connection link 19, two spaced apart anticompression stop members 28, 29 extend inwards from the hinging ends 25 and 26 of the link 19; the stop members consist, for example of two central arms whose opposite front ends in a no stressed condition of the link 19, are slightly spaced apart from each other, to allow an elastic controlled compression of the same link during the closure of the clamping device.

More precisely, as shown in the example of FIG. 2, the opposite flat surfaces 30, 31 at the end of both stop arms 28, 29, are lying in corresponding planes orthogonally arranged to the longitudinal axis S of the link 19. The end surfaces 30, 31 of the sop arms 28, 29 are slightly spaced apart for a short length δ of few tenths of millimeter, for example comprised between 0,2 and 0,40 mm, equivalent to or slightly greater the maximum elastic yielding caused to the same link 19 in the dead centre point of the toggle lever mechanism, in which the three points of the same mechanism, that is the points corresponding to the axis of hinges 21, 20, and the dead centre point on the guide for roller 23, are aligned to the longitudinal axis of the connection link 19.

Preferably, as shown by the dotted line 30' in FIG. 2, the front surface of one or both stop arms, 28, 29 may be slanting for some few degrees, to allow a differentiated and controlled action of axial compression, followed by a side deflection of the connection link 19 during the closure movement of the clamping arm 12.

The connection link 19 may be made in any suitable shape and in one single piece, but preferably may comprise a plurality of shaped plate members as will be further explained with reference to FIG. 8 of the drawings.

Figure 3:
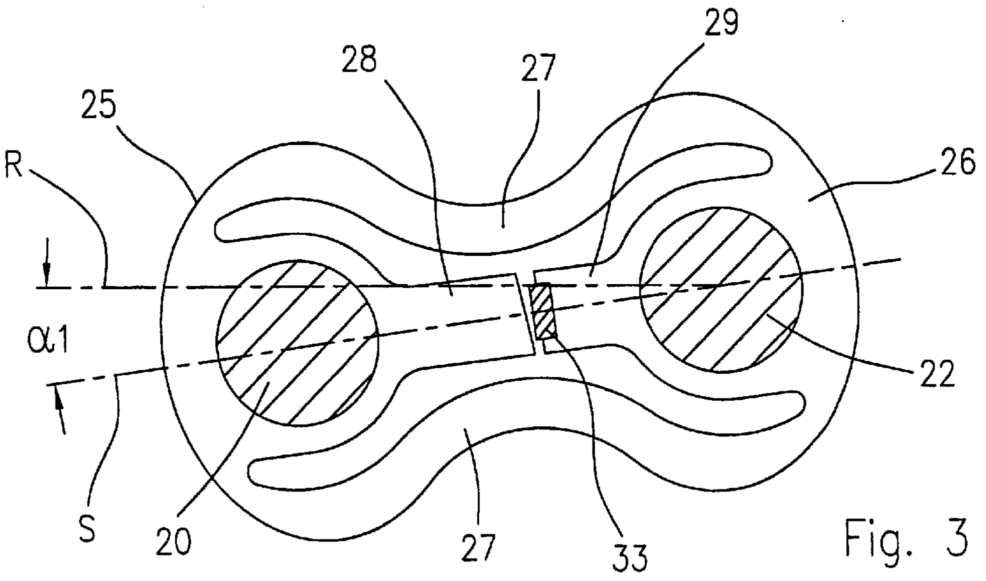
FIG. 3 shows a further embodiment of the connection link.

A second embodiment of the connection link 19 is shown in FIG. 3 and in the enlarged details of FIGS. 4 to 7.

Figure 4:
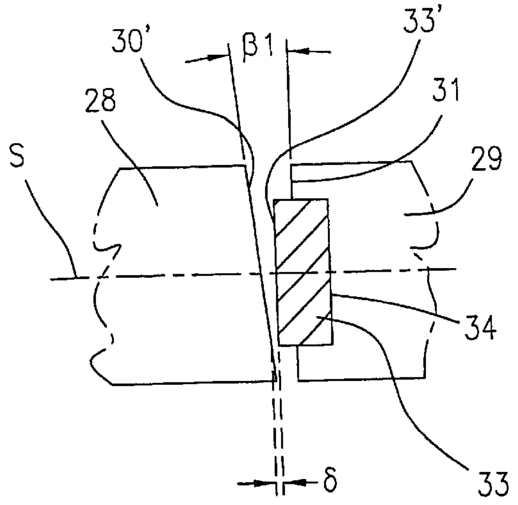
FIGS. 4 to 7 show enlarged details of FIG. 2 in different operative conditions.

More precisely, as shown in the enlarged detail of FIG. 4, one of the stop arms 28, 29, for example arm 29, is provided at its front end with a rectangular seat 34 in which is fitted a contact member 33 protruding from front surface 31 of the arm 29, and provided with a contact flat surface 33' lying on a plane orthogonal to the longitudinal axis S of the connection link 19.

The contact member 33 can be press fitted into the seat 34 or can be loosely supported by the arm 29.

The other stop arm 28, in turn ends with a front surface 30' lying on a slightly slanted plane forming an angle $\beta 1$ for example of 5° or 6° with respect to the front surface 33' of the contact member 33, as shown.

As previously stated, in the non-stressed condition of the connection link 19, the opposing surfaces 30' and 33' at the end of the two stop arms 28 and 29, are slightly spaced apart from each other by a length $\delta$ to firstly allow a controlled elastic yielding action in the axial direction of the connection link 19 upon closure of the clamping device, so as to avoid excessive deformation and possible fatigue failure of the elastic arms 27 which connect the two hinging portions 25, 26 of the same connection link, when subjected to repeated stress.

The values of the angle $\beta 1$ and the minimum distance $\delta$ between the two surfaces 30' and 33' of the stop arms 28, 29 are given purely by way of example, in so far as they must be calculated each time in relation to the shape and dimensions and elastic parameters of the connection link 19, as well as in relation to the designing features of the entire clamping device, and the lacking forces or pressures to be exerted on the workpiece P.

As mentioned previously, the presence of stop arms 28 and 29 having slightly slanted opposite front surfaces, permits a differentiated dual action of the elastic connection link 19; in fact, during the closing step of the clamping device, the connection link 19 is firstly allowed to elastically yield in the axial direction, thereby enabling it to overcome the dead centre of the linkage with a relatively reduced thrusting force, as well as enabling a subsequent rigid behaviour up to the completely closed condition; this endows the system with a feature of absolute irreversibility, with the actuator 15 in the nono-perative condition, in the sense that any possible external force acting on the clamping arm 12 in order to raise the latter, or make it to rotate in the opening direction, would be counteracted by the axial rigidity acquired by the link 19, in that the two stop arms 28 and 29 would assume a slightly slanted relative position, forcing the hinge point 20 with the fork 18 of the piston rod 17, as the reaction force on the arm 12 increases, to be increasingly trusted towards a shoulder 24 against which the guiding rollers 23 of the fork 18 comes to rest upon closure of the clamping device.

The foregoing may be clearly understood by the succession of the figures from 3 to 7 which show successive positions of the stop arms 28, 29 during the closure of the clamping device. In particular, FIG. 3 shows the inclined condition of the connection link 19 an instant prior to reach the dead centre condition of the linkage, in which the longitudinal axis S of the link 19 forms a small angle $\alpha 1$ with the straight line R relating to alignment condition previously referred to for the three points of the linkage, for example an angle equivalent to or slightly wider than the angle $\beta 1$ between the front surfaces 30' and 33' of the central stop arms 28 and 29 of the connection link 19.

In this condition, the two front surfaces 30' and 33' of the stop arms are slightly spaced apart from each other by a distance $\delta$, as shown in the detail by FIG. 4.

Figure 5:
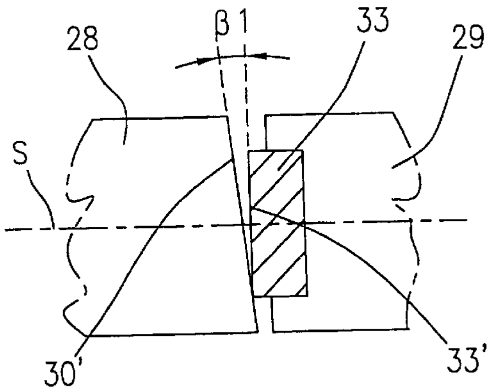

During closure, on continuing the rotation of the connection link 19, when the axis S of the same link comes to coincide with the line R relating to the three points alignment condition for the linkage, the two surfaces 30' and 33' of the stop members 28 and 29 come slightly into contact with each other, eliminating the space $\delta$ between them, as shown in the detail of FIG. 5. In these conditions, the clamping arm 12, or a part connected to it, is only in contact with the piece P, but is not yet exerting the force necessary to lock it against the supporting frame 14.

Figure 6:
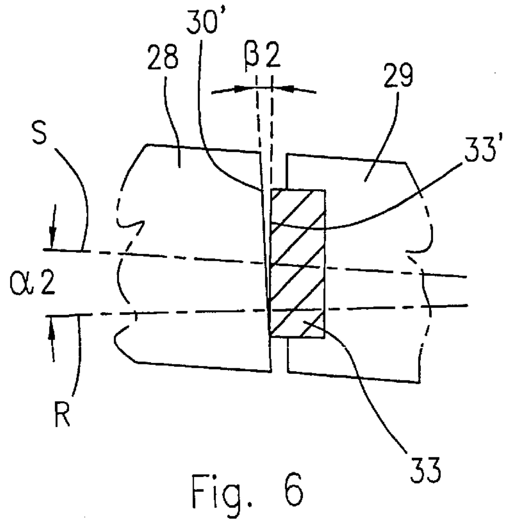
Figure 7:
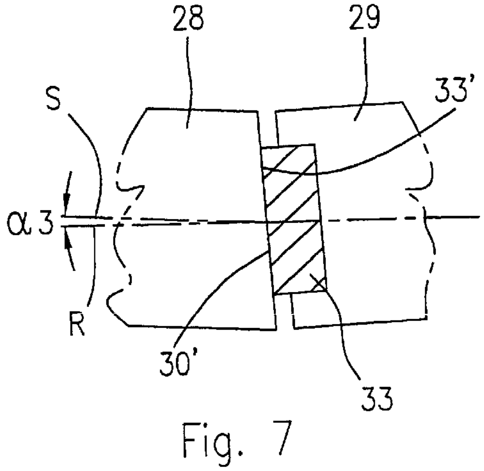

As shown in the subsequent FIGS. 6 and 7, thanks to the elastic yielding action of the connection link 19, suitable controlled and limited by the contact between the front surfaces 30' and 33' of the two stop element 28, 29, the rotation of the connection link 19 can be made to continue by an angle wider than the angle allowed by a rigid connection link in a conventional clamping device, for example by an angle $\alpha 2$ equivalent to 4° or 5°, depending on the characteristics of the connection link and of the entire clamping device.

The final clamping condition of the connection link 19, and the relative position of the front surfaces 30' and 33' of the two stop members 28 and 29 are shown in the enlarged detail of FIG. 6, from which it can be seen that, due to the elastic flexure of the side arms 27 of the connection link 19, and the consequent relative rotation between the contacting surfaces of the two stop members 28 and 29, the longitudinal axis S of the link 19 now forms a positive angle $\alpha 2$ with the straight line R, that is to say the two arms 28, 29 are no longer in line, but on a slight slant with each other.

Therefore, whenever the clamping arm 12 is made to rotate upwards, or towards the open position, by a strong external force, since there still remains a small angle $\beta 2$ between the two front surfaces 30' and 33' of the stop members 28 and 29, due to the elastic deformation of the connection link 19 the front surface 33' of the stop member 29 is brought into close contact with the front surface 30' of the other arm 28; the two arms 28 and 29 undergo a slight relative rotation, forming an angle $\alpha 3$ greater than $\alpha 2$ which tends to make the system irreversible; in this way the connection link 19 behaves like a rigid type.

This guarantees the absolute irreversibility of the system which can be unclamped only by operating the cylinder 15, or other type of control device, to reverse the movements.

A further embodiment of an elastic connection link 19 for a clamping device according to the present invention is shown in FIGS. 8 to 13 of the drawings, in which the same reference numbers of the previous figures, have been used to indicate corresponding or equivalent parts.

Figure 8:
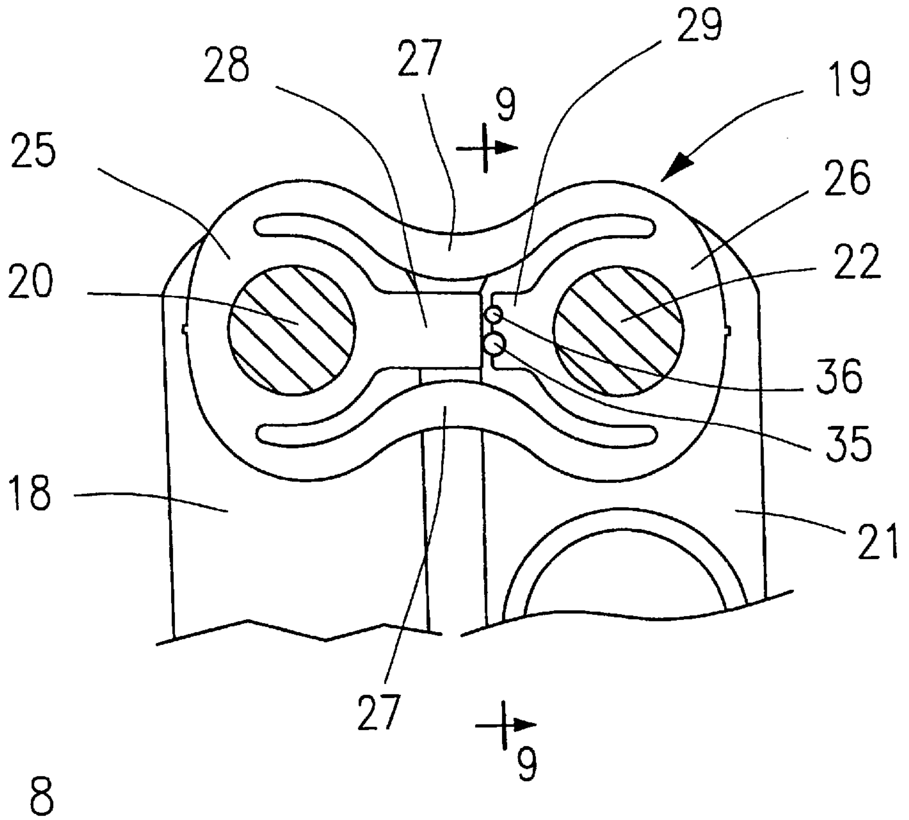
FIG. 8 shows a third embodiment of the connection link according to the invention.
Figure 9:
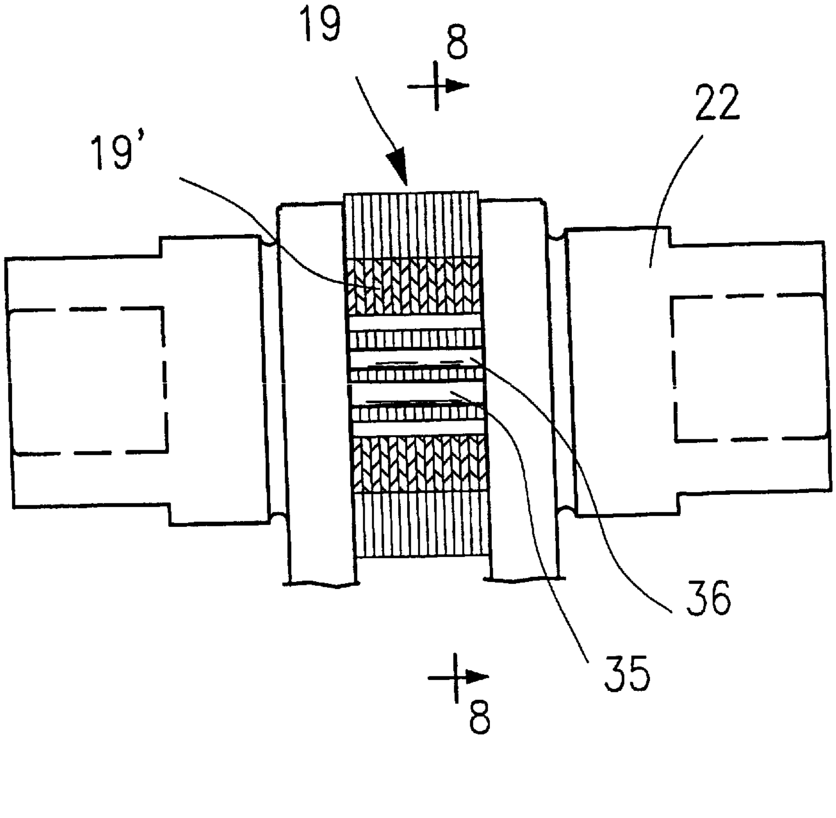
FIG. 9 is a cross-sectional view according to line 9—9 of FIG. 8.

As shown in FIG. 8, the connection link 19 again comprises stop members 28, 29 axially extending from the hinging end parts 25, 26; the opposite ends of two stop members 28, 29 again comprise front contact surface means 30', 33', which still in the non stressed condition of the connection link 19, are spaced apart from each other by a gap $\delta$, for example of 2 or 3 tenths of mm, forming an angle $\beta 1$, for example of 5° or 6°.

One of the stop members 28, 29 has a front contact surface provided by a first contact element 35 and by a second contact element 36 spaced from each other, preferably consisting of cylindrical pins housed in respective semicylindrical seats, in which the pins are transversely extending and axially protruding from the front end of the stop member 29.

The contact surface 33' in this case is provided by an ideal plane tangent to the contact elements 35 and 36.

Figure 10:
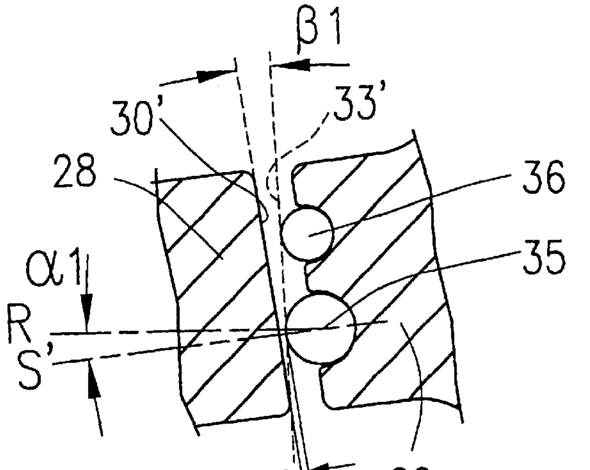
FIGS. 10 to 13 show enlarged details of FIG. 7, in different operative conditions.
Figure 11:
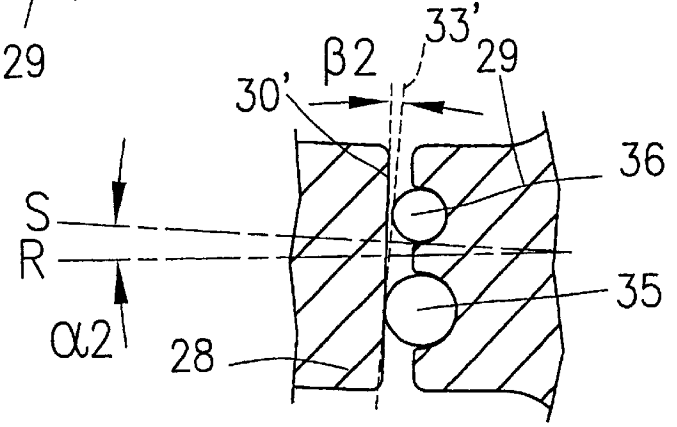
Figure 12:
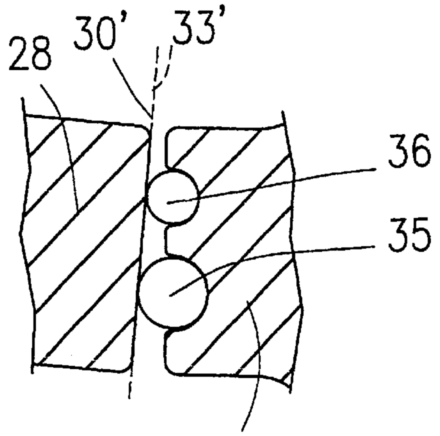

In the embodiment of FIGS. 10 to 12 the contact elements 35, 36 comprises a first cylindrical element 35 having a first diameter, and a second cylindrical element 36 having a second diameter smaller than the preceding one, and in which the longitudinal axis of both contact elements 35, 36 lie in a same plane orthogonal to the longitudinal axis of the stop member 29.

The contact elements 35 and 36 can be press-fitted into respective seats at the front end of the stop member 29, or can be loosely supported between the two opposite sides of the fork 18 or of the lever 21.

As previously stated, the use of the stop members 28 and 29 having opposite front contact surfaces or means, allows a double action to the elastic connection link 19; in fact during a closing step of the clamping device, an elastic controlled yielding is allowed to the connection link 19 in e axial direction, which facilitates the overcoming of the dead centre point of the toggle mechanism with a relatively reduced thrust force. Furthermore it allows a subsequent rigid behaviour of the same connection link 19, once it has been reached the final closing position, which gives to the system an absolute irreversibility.

The above is again clarified by the set of FIGS. 10, 11 and 12 which show successive steps, compared to FIGS. 4 to 7 to which reference is made.

Figure 13:
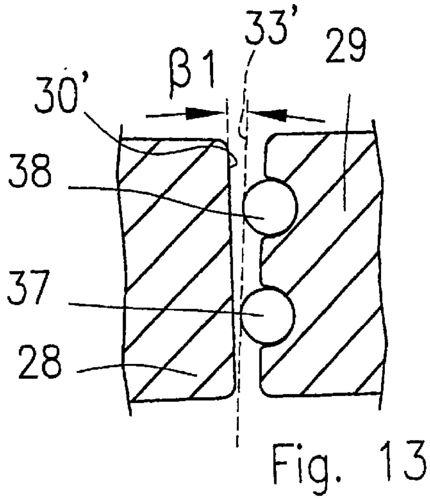

According to a further embodiments of the invention, shown in FIG. 13, the means for limiting the axial compression of the connection link 19 comprise first and second cylindrical contact element 37 and 38 having the same diameter, whose longitudinal axis lye in a plane parallel to the contact plane 33'.

From what has been described and shown in the accompany drawings, it will be obvious that is a clamping device has been provided comprising an elastically yieldable toggle lever mechanism between the clamping arm and the movable rod of the actuator, which enables the device to be opened and closed without any excessive stress on the moving parts, consequently reducing the wear and malfunctioning problems, and at the same time providing an irreversible final clamping action such as to prevent any accidental opening of the clamping device with the actuator in the non-operative condition.

It is understood that what has been described and shown with reference to the accompanying drawings, has been given purely by way of example, and that other modifications are possible without deviating from the scope of the accompanying claims.

What we claim is:

1. A toggle lever clamping device for tightening workpieces to a support frame, comprising:

a box-shaped head having a longitudinal axis;

a clamping arm pivotally connected at one end of the box-shaped head to rotate between open and closed conditions to lock respectively to release the workpiece;

a linear actuator at the other end of the box-shaped head; and a toggle lever mechanism operatively connected between the actuator and the clamping arm;

said toggle lever mechanism comprising an elastically yieldable connection link having a longitudinal axis extending between hinging ends, said toggle lever mechanism having a dead centre condition beyond which the connection link maintains the clamping arm tightened against the workpiece, wherein said elastically yieldable connection link comprises spaced apart stop means arranged to prevent an axial compression of the connection link upon reaching and overcoming said dead centre condition of the toggle lever mechanism.

2. A toggle lever clamping device according to claim 1, wherein said stop means are constructed and arranged to allow an angular deflection of the connection link, beyond the dead centre condition of the toggle lever mechanism, in the closed condition of the clamping arm.

3. A toggle lever clamping device for tightening workpieces to a support frame, comprising:

a box-shaped head having a longitudinal axis;

a clamping arm pivotally connected at one end of the box-shaped head to rotate between open and closed conditions to lock respectively to release the workpiece;

a linear actuator at the other end of the box-shaped head; and a toggle lever mechanism operatively connected between the actuator and the clamping arm;

said toggle lever mechanism comprising an elastically yieldable connection link having a longitudinal axis extending between hinging ends, said toggle lever mechanism having a dead centre condition beyond which the connection link maintains the clamping arm tightened against the workpiece, wherein said elastically yieldable connection link comprises spaced apart stop means arranged to prevent an axial compression of the connection link upon reaching and overcoming said dead centre condition of the toggle lever mechanism, and wherein said stop means comprise first and second surface means oppositely arranged on confronting and angularly slanted contact planes.

4. A toggle lever clamping device according to claim 3, wherein the stop means comprise first and second stop members oppositely arranged and axially extending from the hinging ends of the connection link.

5. A toggle lever clamping device according to claim 4, wherein one of the stop members comprises a contact element transversely and partially protruding extending from the front end of the same stop member of the clamping device.

6. A toggle lever clamping device according to claim 4, wherein one of the stop members comprises a first and a second contact elements transversely extending and partially protruding from the front end of the same stop member of the clamping device.

7. A toggle lever clamping device according to claim 6, wherein said first and second contact elements are in the form of contact members having a rounded peripheral surface.

8. A toggle lever clamping device according to claim 7, wherein each of said first and second contact elements comprises a cylindrical member.

9. A toggle lever clamping device according to claim 8, wherein said contact elements comprise a first contact member having a first diameter, and a second contact member having a second diameter lower than the previous one.

10. A toggle lever clamping device according to claim 9, wherein the longitudinal axis of said first and second contact elements are laying in a same plane orthogonally arranged to the longitudinal axis of the connection link.

11. A toggle lever clamping device according to claim 8, wherein said contact elements comprise a first and a second cylindrical contact members having a same diameter.

12. A toggle lever clamping device according to claim 11, wherein the longitudinal axis of said first and second contact members are laying in a plane angularly arranged in respect to the longitudinal axis of the connection link.

13. A toggle lever clamping device according to claim 6, wherein each of said first and second contact elements is fitted into a seating at the front end of a stop member.

14. A toggle lever clamping device for tightening workpieces to a support frame, comprising:

a box-shaped head having a longitudinal axis;

a clamping arm pivotally connected at one end of the box-shaped head to rotate between open and closed conditions to lock respectively to release the workpiece;

a linear actuator at the other end of the box-shaped head; and a toggle lever mechanism operatively connected between the actuator and the clamping arm;

said toggle lever mechanism comprising an elastically yieldable connection link having a longitudinal axis extending between hinging ends, said toggle lever mechanism having a dead centre condition beyond which the connection link maintains the clamping arm tightened against the workpiece, wherein said elastically yieldable connection link comprises spaced apart stop means arranged to prevent an axial compression of the connection link upon reaching and overcoming said dead centre condition of the toggle lever mechanism, and wherein the connection link comprises a plurality of side by side arranged shaped steel plates.

15. A toggle lever clamping device according to claim 14, wherein each of said shaped steel plates of the connection link comprises hinging ends portions, first and second stop members parallely extending to the longitudinal axis of the connection link, and elastically yielding side arms to connect the end portions of the shaped steel plate.

16. A toggle lever clamping device according to claim 15, wherein said side arms are in the form of inwardly arch shaped arms.

17. A toggle lever clamping device according to claim 1, wherein the stop means provides a stop action via facing surfaces of a T-shaped slot.

18. A toggle lever clamping device according to claim 1, wherein, the elastically compressible link is configured to be yieldable, at the beginning of the closing movement of the clamping arm, in the longitudinal direction of the connection link, and the stop means is conformed and arranged for first limiting the axial compression of the connection link upon reaching the dead center condition of the linkage when the clamping arm starts to urge against a workpiece, and to subsequently allow an angular deflection of the connection link, beyond the dead center condition of the toggle lever mechanism.

19. A toggle lever clamping device according to claim 18, wherein said stop means comprise first and second surface means oppositely arranged on confronting and angularly slanted contact planes.

20. A toggle lever clamping device according to claim 18, wherein the connection link comprises a plurality of side by side arranged shaped steel plates.

* * * * *